United States Patent [19]
Price

[11] Patent Number: 5,879,014
[45] Date of Patent: Mar. 9, 1999

[54] ADJUSTABLE DOLLY

[76] Inventor: Gary A Price, 20031 Frankfort Square Rd., Frankfort, Ill. 60423

[21] Appl. No.: 909,375

[22] Filed: Aug. 11, 1997

[51] Int. Cl.$^6$ .......................................................... B62B 3/02
[52] U.S. Cl. ..................................... 280/47.18; 280/47.19; 280/47.35
[58] Field of Search ............................. 280/638, 35, 651, 280/652, 47.131, 47.16, 47.17, 47.18, 47.19, 47.24, 47.27, 47.28, 47.29, 47.34, 47.35, 79.11, 79.2, 79.3

[56] References Cited

U.S. PATENT DOCUMENTS

| | | |
|---|---|---|
| 1,419,160 | 6/1922 | McKinnon . |
| 4,098,518 | 7/1978 | Minkoff . |
| 4,166,638 | 9/1979 | De Prado . |
| 4,270,741 | 6/1981 | Hurst . |
| 5,112,070 | 5/1992 | Hahn . |
| 5,358,264 | 10/1994 | Hewitt . |

*Primary Examiner*—Richard M. Camby
*Attorney, Agent, or Firm*—Meroni & Meroni

[57] ABSTRACT

An adjustable dolly, said dolly comprising a first base plate and a second base plate, each of said base plates having a pair of wheels attached at opposite ends on a lower surface thereof, a support bar, said support bar being multi-sided, each base plate having an opening extending transversely through a center portion thereof, each opening being multi-sided for mating slideable engagement with sides of the support bar, said first base plate and said second base plate being in coaxial alignment with one another, the support bar being slidable engaged in said openings in each of the base plates, each of said base plates having a clamping means mounted on an upper surface thereof and positioned generally upright, and a brake means, said brake means being affixed to each base plate in locked engagement with support bar, whereby each of said base plates can be positioned in a center area of the support bar so that end portions of the support bar extend on opposite sides of each of the base plates for permitting the opposite ends of the support bar to be used as hand grips for lifting the adjustable dolly with an article secured in between the base plates by said clamp means.

15 Claims, 4 Drawing Sheets

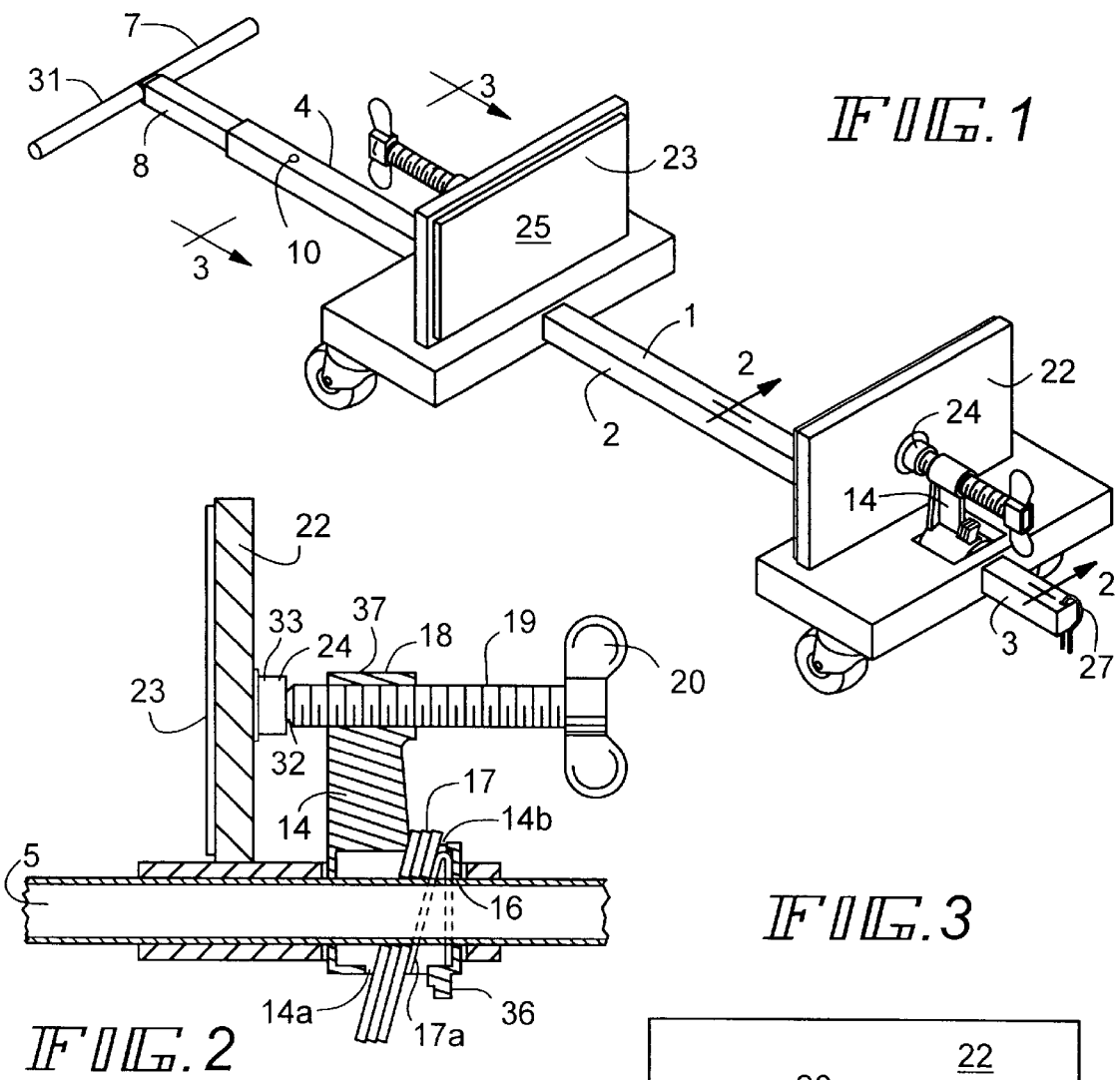
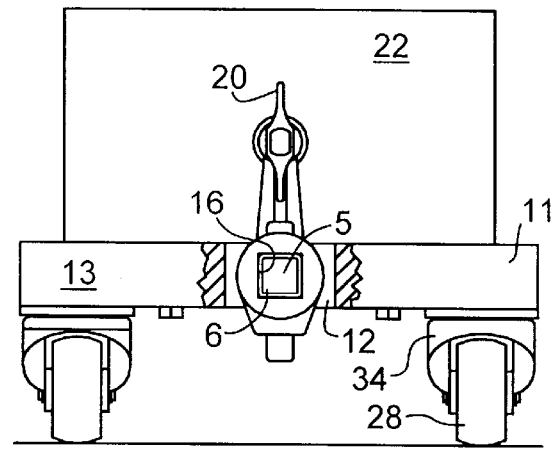
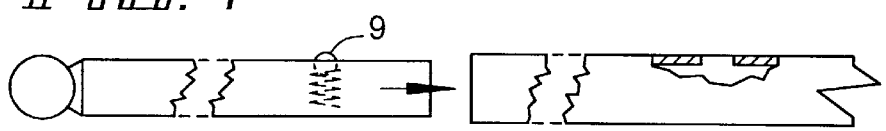

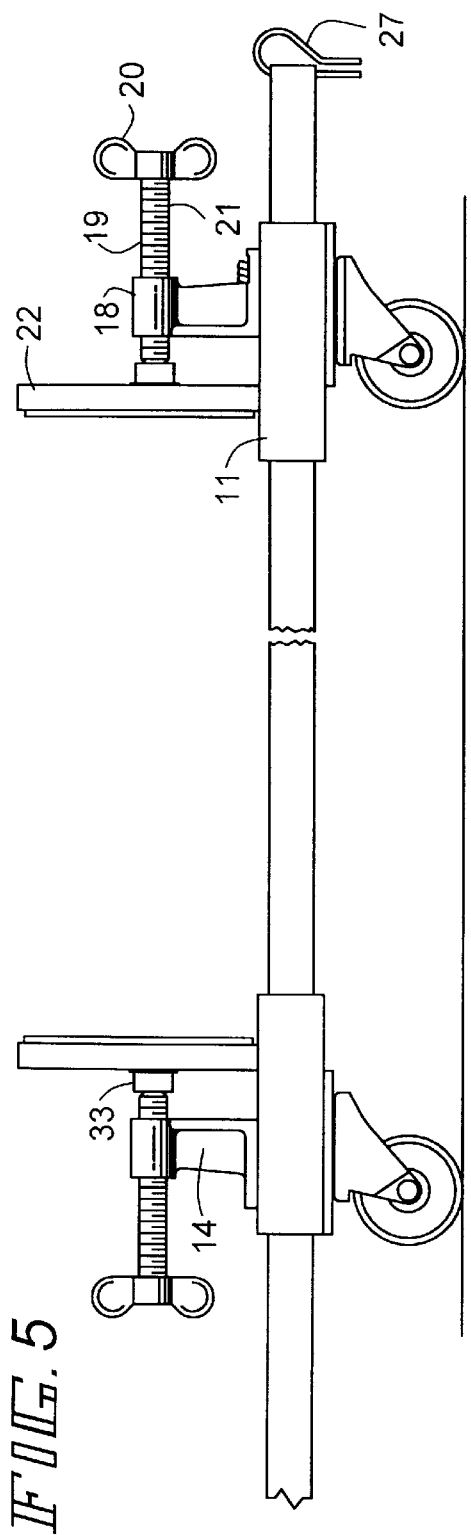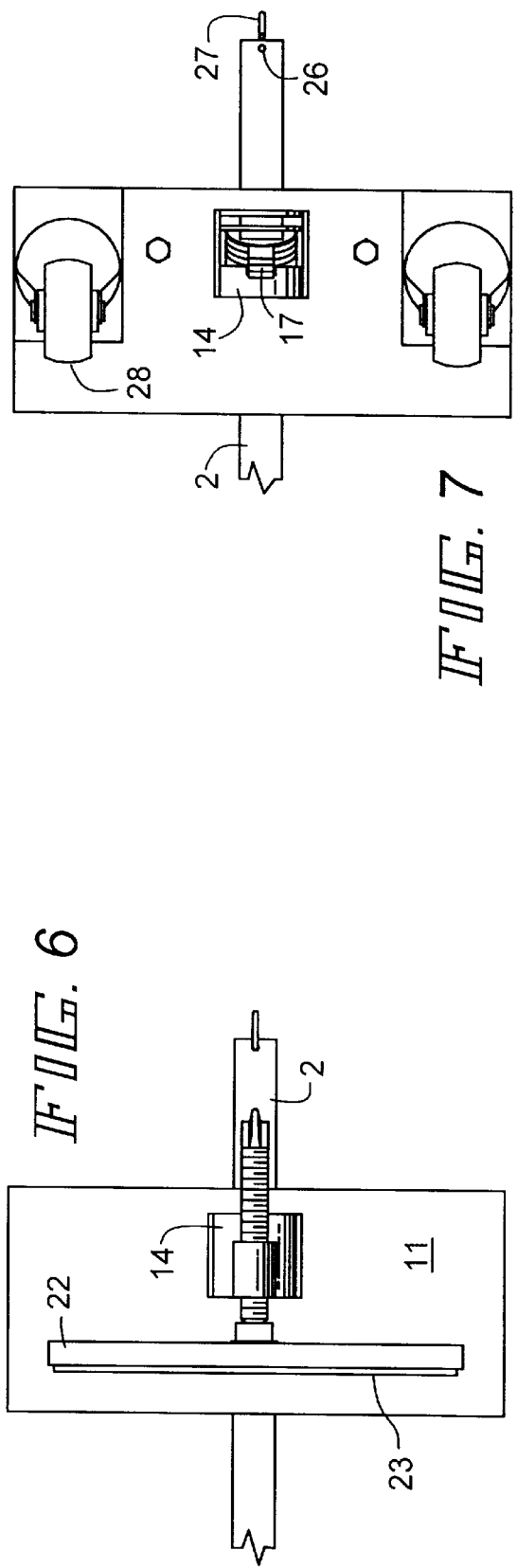

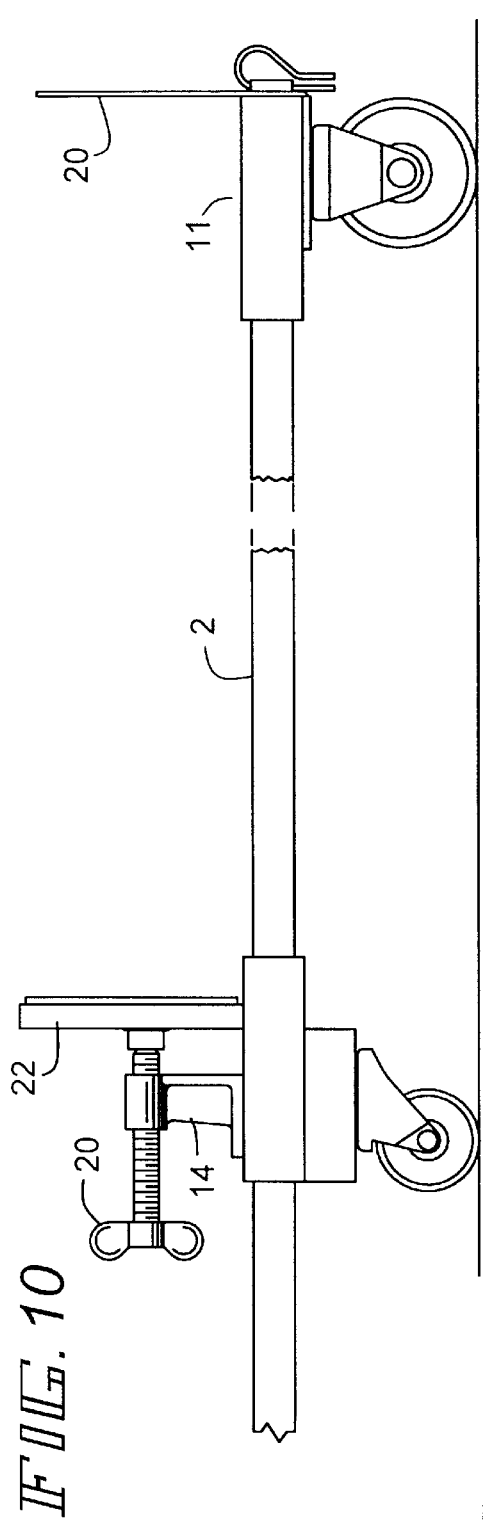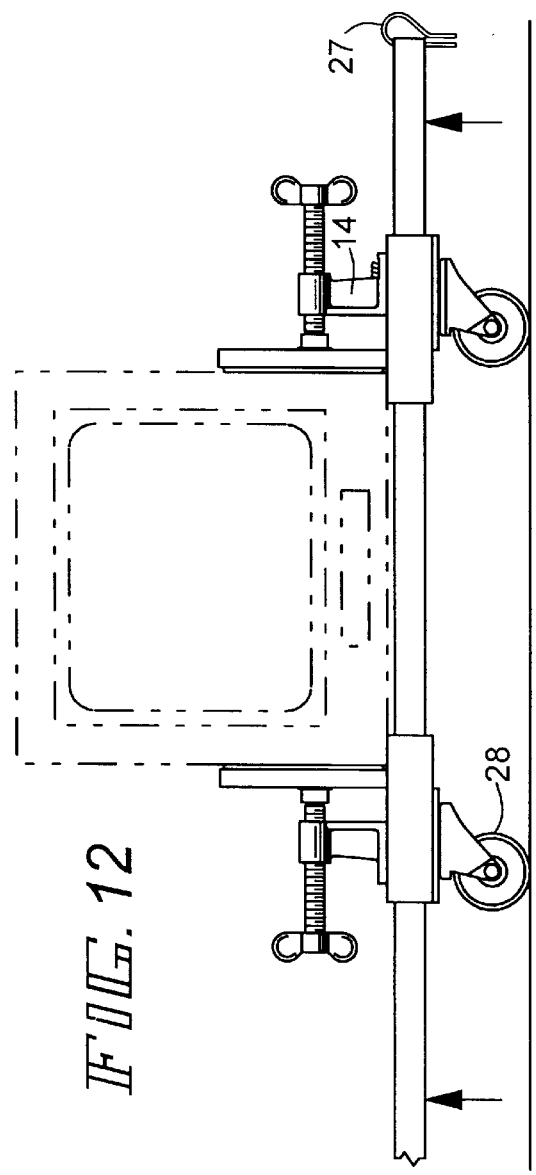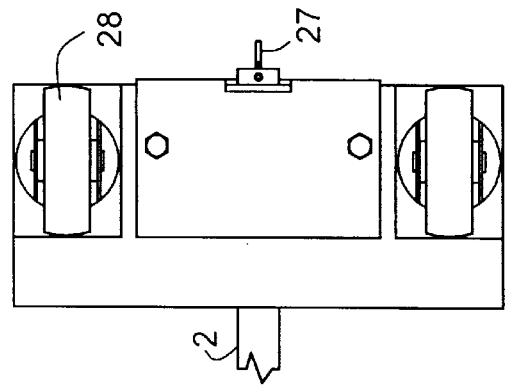

ADJUSTABLE DOLLY

BACKGROUND OF THE INVENTION

1. Field of the Invention

The field to which the invention pertains is dollies or carts for moving heavy objects such as refrigerators, television sets, and the like.

2. Description of the Prior Art

It is known in the prior art to transport objects, such as doors, on wheel mounted vices. It is also known in the prior art to utilize wheeled extendable and retractable platforms fitted with straps for the securement of a load to a base.

The present invention provides significant advancement over the known prior art by enabling a person or more than one person to readily transport a heavy article or any size article.

A further object of the invention is to provide a novel adjustable dolly which allows for any size or weight load to be removably attached to the dolly while preventing excessive movement of the load during transport.

A further object of the present invention is to provide a novel dolly which allows for one or more persons to lift and transport an article of any size or weight without excessive movement of the load.

These and other types of dollies disclosed in the prior art do not offer the flexibility and invented features of the present dolly. As will be described in greater detail hereinafter, the dolly of the present invention differs from those proposed.

SUMMARY OF THE INVENTION

The nature of the present invention is an adjustable dolly which allows for the lifting and transport of a load of any size or weight by one or more persons without excessive movement of the load.

In operation, the adjustable dolly includes a non-circular support bar upon which is provided a plurality of the base plates each of which support one of the jaws of a generally upright clamp assembly. Attached to the base plate opposite the clamp assembly are a plurality of wheels which allow for the dolly to be rolled along a surface. In one embodiment, the wheels are casters.

Each of the base plates is inserted over the non-circular support through a correspondingly shaped passageway extending transversely through a central portion of the base plate. The plurality of base plates are in coaxial alignment with one another while slideably engaged upon the non-circular support bar.

The clamp assembly has at one end a brake member which is inserted over the non-circular support bar and engages the support bar so as to adjustably fix the position of the clamp assembly in locked engagement with the support bar.

In one embodiment, a plurality of base plates support a clamp wherein between the jaws of the clamp is removably clutched an article. In this embodiment, an operator can lift the dolly and secured article at an acute angle from the end opposite of the load. In this position, the wheels attached to one of the base plates remains in contact with the rolling surface and the object contained between the jaws of the clamp can be easily transported by rolling.

In a second embodiment, an article to be transported is placed between the jaws of the clamp assembly which are then adjusted so as to removable clutch the article therebetween. Generally, the article is positioned so that it is located at the center of the support bar so that a predetermined length of the support bar extends from either side of the clutched article. Once the article is clutched between the jaws of the clamp, a plurality of operators can lift and transport the article by lifting the adjustable dolly at the ends of the support bar extending from either side of the clutched article.

In a third embodiment, one of the base plates is replaced by a nose plate. The nose plate is slid under the article. The article is then clutched between a jaw of the clamp assembly and the nose plate. A person can lift the adjustable dolly and clutched article to an acute angle and transport the same by rolling it along the wheels.

DESCRIPTION OF THE DRAWINGS

Other features of my invention will become more evident from a consideration of the following detailed description of my patent drawings, as follows:

FIG. 1 is a perspective view of a preferred embodiment of my adjustable dolly in accordance with important features of my invention;

FIG. 2 is a partial cross-sectional side view of my adjustable dolly taken along the lines 2—2 as seen in FIG. 1;

FIG. 3 is a back side view of my adjustable dolly on lines 3—3 in looking in the direction indicated by the arrows as seen in FIG. 1;

FIG. 4 is an enlarged partial exploded side view illustrating the removable handle on my adjustable dolly;

FIG. 5 is a side view of my adjustable dolly illustrating important features of my invention;

FIG. 6 is a partial top-side view of one of the clamping base members on my adjustable dolly;

FIG. 7 is a partial bottom-side view of the clamping base member, as shown in FIG. 6;

FIG. 10 is a side view of another modified version of my adjustable dolly embodying important features of my invention;

FIG. 11 is a bottom-side view of yet another modified base member on a modified version of my adjustable dolly; and FIG. 12 is a fragmentary side view of my adjustable dolly similar to FIG. 12 with a TV view clamped thereon and with the arrows at opposite ends showing how two persons can lift at the arrows and pick up and carry the dolly and the TV from one location to another.

DETAILED DESCRIPTION OF THE INVENTION

Figure 8:
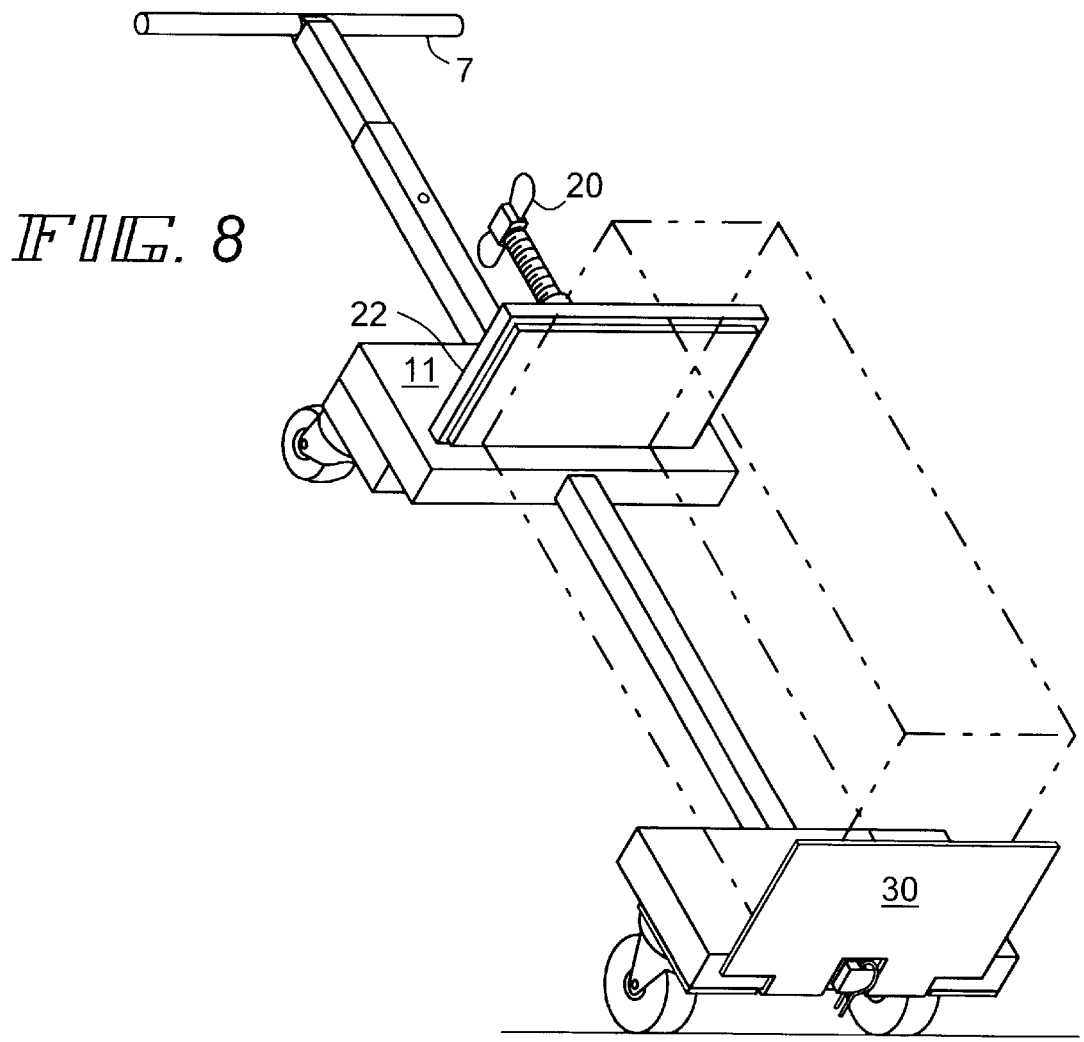
FIG. 8 is a perspective view of a modified version of my adjustable dolly illustrating other important features of my invention.

Referring now to the drawings, FIG. 1 shows my new and improved adjustable dolly. The dolly includes a non-circular bar or bar shaped member or tube 1. As shown in FIG. 1, in one embodiment, the non-circular bar or tube 1 may be a square bar or tube 2. The square bar or tube 2 has a first end 3 and a second end 4.

As shown in FIG. 1, in one embodiment, the square tube 2 is provided with a central bore 5 running a predetermined longitudinal length of the square tube 2. The opening 6 to the central bore 5 is located at the second end 4 of the square tube 2 and is provided for the attachment of a handle 31. As shown in FIG. 1, inserted within the opening 6 of the central bore 5 is the body 8 of a T-shaped handle 7. The body 8 of the T-shaped handle 7 has an external diameter of the same general shape and of slightly smaller diameter than the diameter of the central bore 5. The handle 31 is adjustable so that it may variably be extended a desired length out of the central bore 5. In one embodiment, the handle 31 is fastened within the bore 5 through the interaction between a peg 9 which projects from the body 8 of the handle 31 and a peg hole 10 located in one side 4 of the square tube 2 at its second end 4. The peg 9 engages with and protrudes from the peg hole 10 in order to lock the adjustable handle 31 in place.

FIG. 2 shows a cross section of the square tube 2 with one of a plurality of base plates 11 received thereon. The base plate 11 is formed with a tube passageway 12 of the same shape as the non-circular tube 1 and of a diameter slightly larger than the non-circular tube 1 which runs centrally through the base plate sides 13 of the base plate 11. The non-circular tube 1 is insertable within the tube passageway 12. As shown in FIG. 2, in one embodiment, the tube passageway 12 may be square shaped so as to slideably accept within it the square tube 2.

As shown in FIG. 2, the adjustable dolly also includes a clamp assembly 14 having a distal 36 and a proximal end 37.

As shown in FIG. 1, the base plate 11 has a clamp passageway 15 provided for the insertion of the brake mechanism 17 located at the distal end 36 of the clamp assembly 14. The clamp passageway 15 runs generally perpendicular to the tube passageway 12. The shape of the clamp passageway 15 corresponds to the shape of the brake mechanism 17 and is of a diameter slightly larger than the external diameter of the brake mechanism 17. As assembled, the clamp assembly 14 is inserted within the clamp aperture 15 of the base plate 11 so that the brake sleeve 16 of the brake mechanism 17 is aligned with the tube passageway 12. In this aligned position, the clamp assembly 14 and the base plate 11 are inserted via the tube passageway 12 and the brake sleeve 16 over the non-circular tube 1. As shown in FIGS. 2 and 7, a brake mechanism 17 located on the clamp assembly 14 acts so as to lock the base plate 11 at a selected position along the length of the non-circular tube 1.

The brake mechanism 17 is releaseable by compressing angular spring 17a by manually moving stacked plates 17b back and forth in the directions indicated by an arrow (FIG. 2) shown under the plates 17b which then releases the locking action of the plates 17b against the bar 5. As shown in FIG. 2, the brake is in a locked position. When the spring 2 is compressed and a bottom end of the plates 17b are moved in a more upright position thereby releasing the brake 17, the bar 5 and the clamp structure 14 can move to another adjusted position to vary the relative position to each other to a new adjusted position. Upon manual release of a bottom end of the plate 17b, the spring 17a then moves the brake mechanism to a locked position as shown in FIG. 2.

As shown in FIGS. 3 and 5, the clamp assembly 14 has, at its proximal end 37 opposite the brake mechanism 17, a female threaded sleeve 18 for acceptance of a male threaded bolt 19. At one end of the male threaded bolt 19 is a wing nut 20 having corresponding grooves to the male threaded bolt 19 for rotable attachment thereto. The male threaded bolt 19 is tightened within the female threaded sleeve 18 by rotation of the wing nut 20. Fixed to the end of the male threaded bolt 19 opposite of the wing nut 20 is the ball 32 of a ball and socket assembly 24. The ball 32 of the ball and socket assembly 24 is insertable within the socket 33 and freely rotates therein.

To the end of the socket 33 opposite the insertion of the ball 32 is mounted a jaw 22 of the clamp assembly 14. The jaw 22 is pivotable due to its attachment to the socket 33. As shown in FIGS. 1;3, and 8, in one embodiment, the jaw 22 is generally rectangularly shaped and attached at its center to the ball and socket assembly 24. As shown in FIG. 1, in one embodiment, a non-slip pad 23 is attached to the jaw 22 at a jaw face 25 located opposite the point of attachment of the jaw 22 to the ball and socket assembly 24. In one embodiment, the non-slip pad 23 is rubber. The function of the non-slip pad 23 is to aid in the clutching action of the jaws 22 of the clamp assembly 14 by preventing the article to be transported from slipping from within the clutch of the jaws 22 and providing padding to prevent damage to the surface of the article being transported.

As shown in FIGS. 5 and 7, in one embodiment, at the second end 4 of the square tube 2 is located a vertical pin slot 26 for insertion of a pin 27 so as to stop the base plate 11 from traveling past the second end 4 of the square tube 2.

As shown in FIGS. 11 and 7, a plurality of wheels 28 are secured to the base plate 11 opposite the female threaded sleeve 18 of clamp assembly 14. In one embodiment, the wheels may be casters 34. The casters 34 allow for rolling of the adjustable dolly along a surface. In one embodiment, the casters 34 may be provided with a wheel brake mechanism.

In use, the apparatus of the present invention can be used as a one person dolly where an article to be transported is carried between the faces 25 of a plurality of jaws 22. This arrangement is shown in FIG. 5 where one of the plurality of jaws 22 is located at the first end of the square tube 2. An article is placed against the face 25 of the pre-positioned jaw 22. Then, a second jaw 22 is positioned so that its face 25 is in contact with a surface of the article. The brake mechanisms 17 on the clamp assembly 14 are then secured so as to prevent longitudinal movement of the base plates 11 along the square tube 2. The article is further secured within the faces 25 of the jaws 22 by adjustment of the wing nut 20. Tightening of the wing nut 20 moves the jaws 22 of the clamp assembly 14 into firmer contact with the article. The adjustable dolly may now be lifted to an acute angle at the handle 7 while maintaining the casters 28 of the first base plate 11 in contact with the rolling surface. In this manner, one person can transport a heavy article by rolling.

In another embodiment (FIG. 12), the apparatus of the present invention is used as a two person lift. As shown in FIG. 12, the apparatus is assembled as above utilizing two base plates 11 supporting two jaws 22 of a clamp assembly 14. The article to be transported indicated to be a TV Set in FIG. 5 is placed on the square tube 2 and the jaws 22 are adjusted through the action of the wing nut 20 so that firm contact is applied to the surface of the article by the faces 25 of the jaws 22. The adjustable dolly of the present invention may then be lifted at the arrows shown in FIG. 12 by two people from transporting the TV from one place to another.

Figure 9:
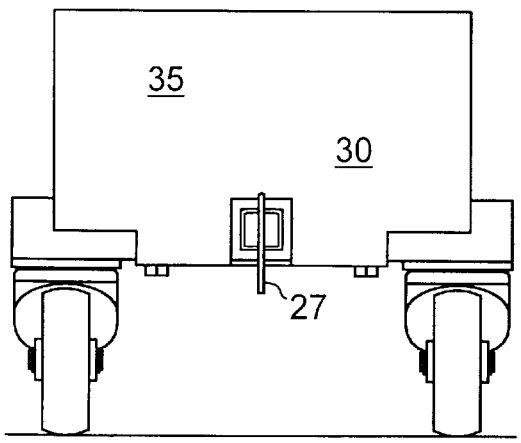
FIG. 9 is a front-side view of the modified version of my adjustable dolly showing a modified base member.

In a further embodiment, as shown in FIGS. 8 and 9, a base plate 11 located at the first end of the square tube is replaced by a nose plate 30. In one embodiment, the nose plate 30 is L-shaped 35. At the second end of the square tube 2 a base plate 11 supporting a jaw 22 of a clamp assembly 14 is inserted over the square tube 2 and slid to a predetermined position along the square tube 2. The L-shaped plate 35 is inserted under an article to be carried. The jaw 22 of the clamp assembly 14 is moved into contact with the surface of the article to be carried through the tightening of the wing nut 20. The adjustable dolly may then be lifted to an acute angle at the handle 7 and the article transported by a person by rolling it on the casters 28.

The apparatus of the present invention may be constructed of many materials including wood, steel, and plastics.

As various possible embodiments may be made in the above invention for use for different purposes and as various changes might be made in the embodiments above set forth, it is understood that all of the above matters here set forth or shown in the accompanying drawings are to be interpreted as illustrative and not in a limiting sense.

I claim:

1. An adjustable dolly, said dolly comprising a first base plate and a second base plate, each of said base plates having a pair of wheels attached at opposite ends on a lower surface of the base plate, a support bar having a first and a second end, the support bar having a plurality of sides, each base plate having an opening extending transversely through a center portion of the base plate, each opening having a plurality of sides for slideable mating engagement with the sides of the support bar, the first base plate and said second base plate being in coaxial alignment with one another, the support bar being slidably engaged in the openings in each of the base plates, each of said base plates having a releaseable clamping means mounted on an upper surface of the base plate and positioned generally upright, each of said base plates having a brake means, the brake means being affixed to each base plate and being engageable with said support bar for adjustably fixing the position of each base plate in locked engagement with the support bar, whereby each of said base plates can be positioned in a center area of the support bar so that end portions of the support bar extend on opposite sides of each of the base plates for permitting the opposite ends of the support bar to be used as hand grips for lifting the adjustable dolly with an object secured in between the base plates by the clamp means.

2. The adjustable dolly of claim 1, wherein said wheels on each of the base plates are swivel mounted casters.

3. The adjustable dolly of claim 1, further including a removable handle, the removable handle being securable and removable from one end of the support bar nearest the second base plate, whereby when the handle end of the support bar is elevated the adjustable dolly can be manually pulled or pushed with an object secured on the adjustable dolly by means of the clamp means located at a lower end of the support bar.

4. The adjustable dolly of claim 1, further including a stop means positioned on one end of the support bar to prohibit the base plates from being removed from the support bar on the first end.

5. The adjustable dolly of claim 1, wherein said clamp means on the second base plate is removable and replaceable with an L-shaped nose plate, said nose plate being attached to the first base plate on the lower surface thereof and extending outwardly at a lower edge of the base plate relatively perpendicular to said first base plate, whereby a user can secure and transport an article on the adjustable dolly in between the nose plate and the clamp means on the first base plate.

6. The adjustable dolly of claim 1, wherein each of said clamp means further include a screw means, said screw means having a handle at one end and means at an opposite end attaching the screw means to the clamp means, the screw means being rotatable along an axis parallel to the support bar so as to extend and retract the clamp means.

7. An adjustable dolly comprising:
a base plate, said base plate having a pair of wheels attached at opposite ends on a lower surface of the base plate,
a support bar having a first and a second end, said support bar formed of a plurality of sides,
the base plate having a transferse opening through a center portion of the base plate, said transverse opening formed of a plurality of sides for slideable mating engagement with the sides of the support bar,
a plate having a transverse aperture through a center portion of the plate, said transverse aperture formed of a plurality of sides far slideable mating engagement with the sides of the support bar,
the base plate and the plate being in coaxial alignment with one another, the support bar being slideably engageable in the opening of the base plate and the aperture of the plate,
said base plate having a clamping means mounted on an upper surface of the base plate and generally in an upright position, the base plate having a brake means, the brake means being affixed to the base plate and engageable with the support bar for adjustably fixing the position of the base plate in locked engagement with the support bar, whereby the base plate can be positioned in a center area of the support bar so that the end portions of the support bar extend on opposite sides of the base plate, and the plate being positioned at the first end of the support bar opposite the base plate whereby an object may rest upon the plate and the base plate may be adjusted so as to contact the object and maintain it removably fixed between the base plate and the plate.

8. The adjustable dolly of claim 1 wherein the plate is L-shaped.

9. An adjustable dolly, said dolly comprising: a first base plate and a second base plate, each of said base plates having a pair of wheels attached at opposite ends on a lower surface of the base plate, a support bar having a first and a second end support bar having a plurality of sides each base plate having an opening extending transversely through a center portion of the base plate, each opening being having a plurality of sides for slideable mating engagement with the sides of the support bar, the first base plate and said second base plate being in coaxial alignment with one another, the support bar being slidably engaged in the openings in each of the base plates, each of said base plates having a clamping means mounted on an upper surface of the base plate and positioned generally upright, each of said base plates having a brake means, the brake means being affixed to each base plate in locked engagement with the support bar for adjustably fixing the position of each base plate in locked engagement with the support bar, whereby said second base plate can be positioned in a center area of the support bar and said first base plate can be positioned at the first end of said support bar for permitting the second end of the support bar to be used as a hand grip for lifting the adjustable dolly to an acute angle with an object secured in between the base plates by the clamp means.

10. The adjustable dolly of claim 9 wherein each bar has two pairs of parallel sides and with said opening having a matching shape.

11. The adjustable dolly of claim 10 wherein said tubular bar has an external shape that is square with two pairs of the parallel sides.

12. The adjustable dolly of claim 9, further including a removable handle, the removable handle being securable and removable from one end of the support bar nearest the second base plate, whereby when the handle end of the support bar is elevated the adjustable dolly can be manually pulled or pushed with an object secured on the adjustable dolly by means of the clamp means located at a lower end of the support bar.

13. The adjustable dolly of claim 9, further including a stop means positioned on one end of the support bar to prohibit the base plates from being removed from the support bar on the first end.

14. The adjustable dolly of claim 9, wherein said clamp means on the second base plate is removable and replaceable with an L-shaped note plate, said nose plate being attached to the first base plate on the lower surface thereof and extending outwardly at a lower edge of the base plate relatively perpendicular to said first base plate, whereby a user can secure and transport an article on the adjustable dolly in between the nose plate and the clamp means on the first base plate.

15. The adjustable dolly of claim 12, wherein each of said clamp means further include a screw means, said screw means having a handle at one end and means at an opposite end attaching the screw means to the clamp means, the screw means being rotatable along an axis parallel to the support bar so as to extend and retract the clamp means.

* * * * *